(No Model.)
D. WESEMANN.
SCREEN.
No. 383,510. Patented May 29, 1888.
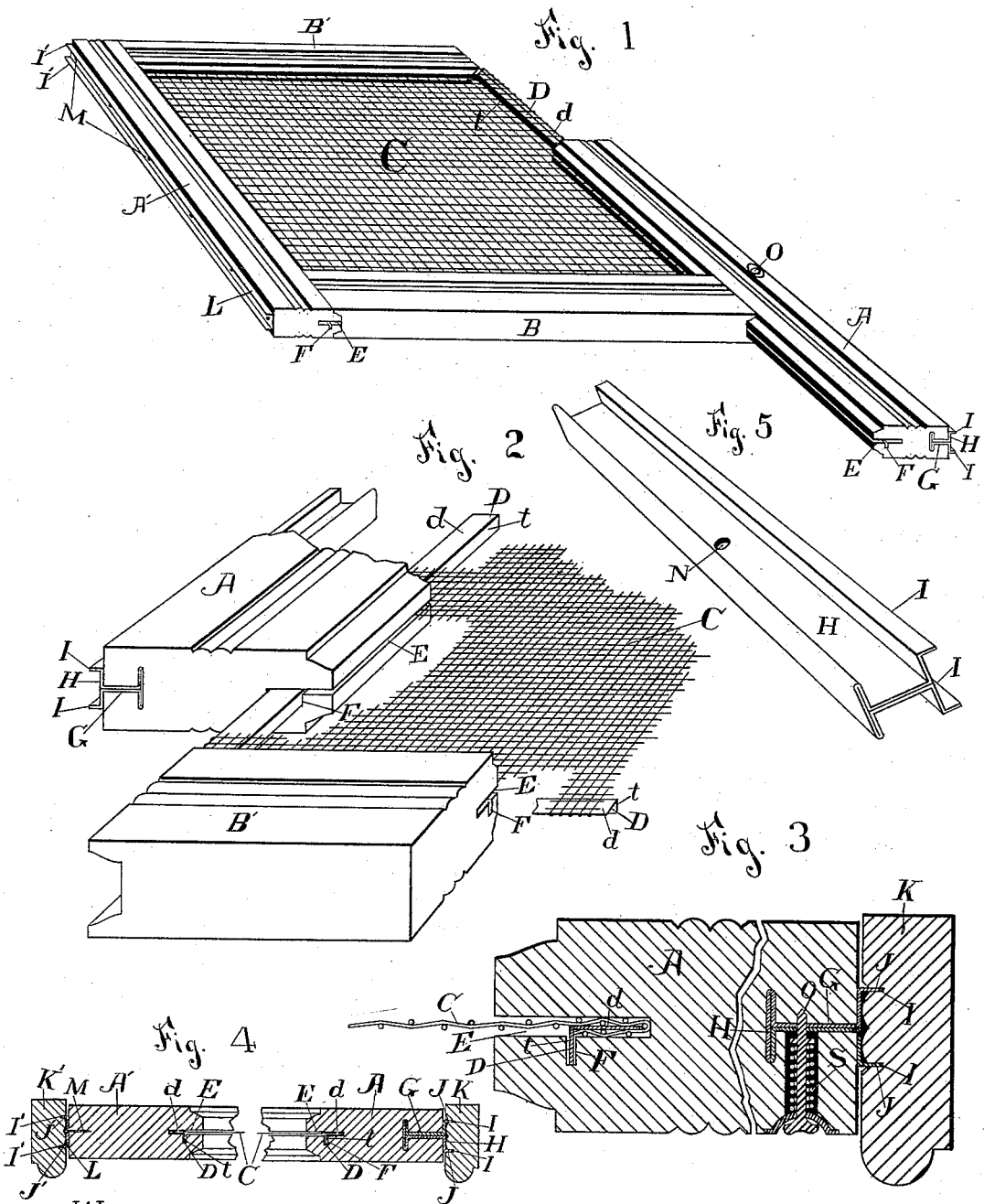

UNITED STATES PATENT OFFICE.

DIETRICH WESEMANN, OF LOS ANGELES, CALIFORNIA, ASSIGNOR OF ONE-HALF TO JOHN J. JONES, OF SAME PLACE.

SCREEN.

SPECIFICATION forming part of Letters Patent No. 383,510, dated May 29, 1888.

Application filed December 22, 1887. Serial No. 258,730. (No model.)

*To all whom it may concern:*

Be it known that I, DIETRICH WESEMANN, a subject of the Emperor of Germany, residing at Los Angeles, in the county of Los Angeles and State of California, have invented a new and useful Improvement in Wire Screens, of which the following is a specification.

The object of my invention is to provide a screen which can be conveniently inserted in and withdrawn from the window-frame; also to so construct the screen and its frame that the wire-gauze of the screen will be firmly secured therein in such a manner as to wholly conceal the means whereby the wire gauze is secured in the screen-frame.

The drawings illustrate my invention.

Figure 1 is a perspective view of a window-screen provided with my improvements. Fig. 2 is a detail perspective view more clearly illustrating portions of my invention. The wire-gauze is broken away to expose the groove E F and tin trough D. Fig. 3 is an enlarged cross-section of one of the stiles of a screen provided with my improvement, together with the stop in which the screen-guides are set. This view is enlarged in order that the several parts may be shown clearly. Fig. 4 is a cross-section illustrating the manner in which the screen is secured in the window-frame. A portion of the screen-frame is broken away to contract the view. Fig. 5 illustrates the form of the bent tin guide H.

A A' are the stiles of the screen, and B B' are the rails.

C is the wire-gauze. The gauze is secured in the frame of the screen by means of the tin-trough fastening described in my application for Letters Patent filed in the United States Patent Office November 3, 1887, Serial No. 254,170; and I do not lay any claim in this application to anything shown and claimed in said application heretofore filed by me.

The fastening herein shown is an improvement over that shown in my former application, in that I have invented means whereby the fastening is wholly concealed, whereas in the screen described in said former application a portion of the tin trough is exposed to view.

Referring again to the drawings herewith, D is the tin trough, around one side, d, of which is lapped the edge of the wire gauze C.

E is a groove cut into the inner edge of the stiles and rails of the frame, extending from end to end thereof in a plane approximately parallel with the sides of the stile or rail, and extending from end to end of the stile or rail, as the case may be. A groove, F, opening into the groove E at or near its mid-width, at a point wholly within the groove, extends from end to end of the stile or rail. This groove is of sufficient width to receive the narrow side t of the tin trough. A T-shaped groove is formed by the two grooves E and F, and when the wire-gauze is lapped around the side d of the trough D, and the trough and gauze are inserted into the double groove E F, as shown, the tin is entirely concealed, thus giving the screen a more attractive appearance than that of the screen heretofore invented by me and described in the application for Letters Patent hereinbefore referred to.

In order that my improved screen may be easily inserted into and removed from the window-frame, I provide a T-shaped groove, G, in one of the stiles of the screen-frame, extending from end to end thereof, and I provide a strip of tin, H, or other thin sheet metal, which I bend upon itself to form a T, to fit into the groove G, as shown in the drawings, allowing the edges of the tin to project from the edge of the stile. The two edges of the tin are bent apart and pressed flat upon the edge of the stile, and are then bent at right angles, so as to project from the edge of the stile to form the tongues I I, projecting at right angles from the edge of the stile.

I provide grooves J J in the stop or jamb K, which receive the tongues I I, so that they may slide therein. I fit only one of the stiles with this device, and I provide the other one with a shallow rectangular tin trough, L, which I attach thereto by nails M, or other suitable means.

The stop K' is provided with grooves J' in the same manner as the stop K. The sides of the rectangular trough L project from the stile to form tongues I' I', corresponding to the tongues I I. These tongues slide in the grooves J' J'. The tin guide H is fastened in the frame of the screen by the spring-bolt O, which passes through a hole, N, in the guide H. This bolt is thrown into the hole by the spring S.

When it is desired to remove the screen from the window-frame, the bolt O is withdrawn, and the tin guide H may then be slipped out of the stile, a knife or other thin instrument being inserted into the groove to start it out.

I am enabled by bending the tin H, as shown in the drawings, to produce with very little expense a guide of the form desired.

Now, having described my invention, what I claim as new, and desire to secure by Letters Patent, is—

1. The combination of the rail of the screen having the groove E therein, and the groove F, opening into the groove E at or near its mid-width, at a point wholly within the groove, the trough D, retained in said grooves and not exposed to view, and the material of the screen having its edges lapped around one side of the trough.

2. The combination of the screen-frame provided with the T-shaped groove G in one of its stiles, the guide H I I, held in the groove G, the stops K K', provided with grooves J J and J' J', and the rectangular trough L I' I', secured to the other stile.

3. In a screen substantially such as set forth, the combination of the stile A, having the T-shaped groove therein, the guide H, conformed to the shape of the groove and provided with the tongue I I and the hole N, and a spring-bolt adapted to be inserted into and withrawn from the hole, as and for the purpose set forth.

DIETRICH WESEMANN.

Witnesses:
JAS. R. TOWNSEND,
ALFRED I. TOWNSEND.